Dec. 12, 1933.    R. A. SMITH    1,939,370
FLEXIBLE COUPLING
Filed Aug. 6, 1930
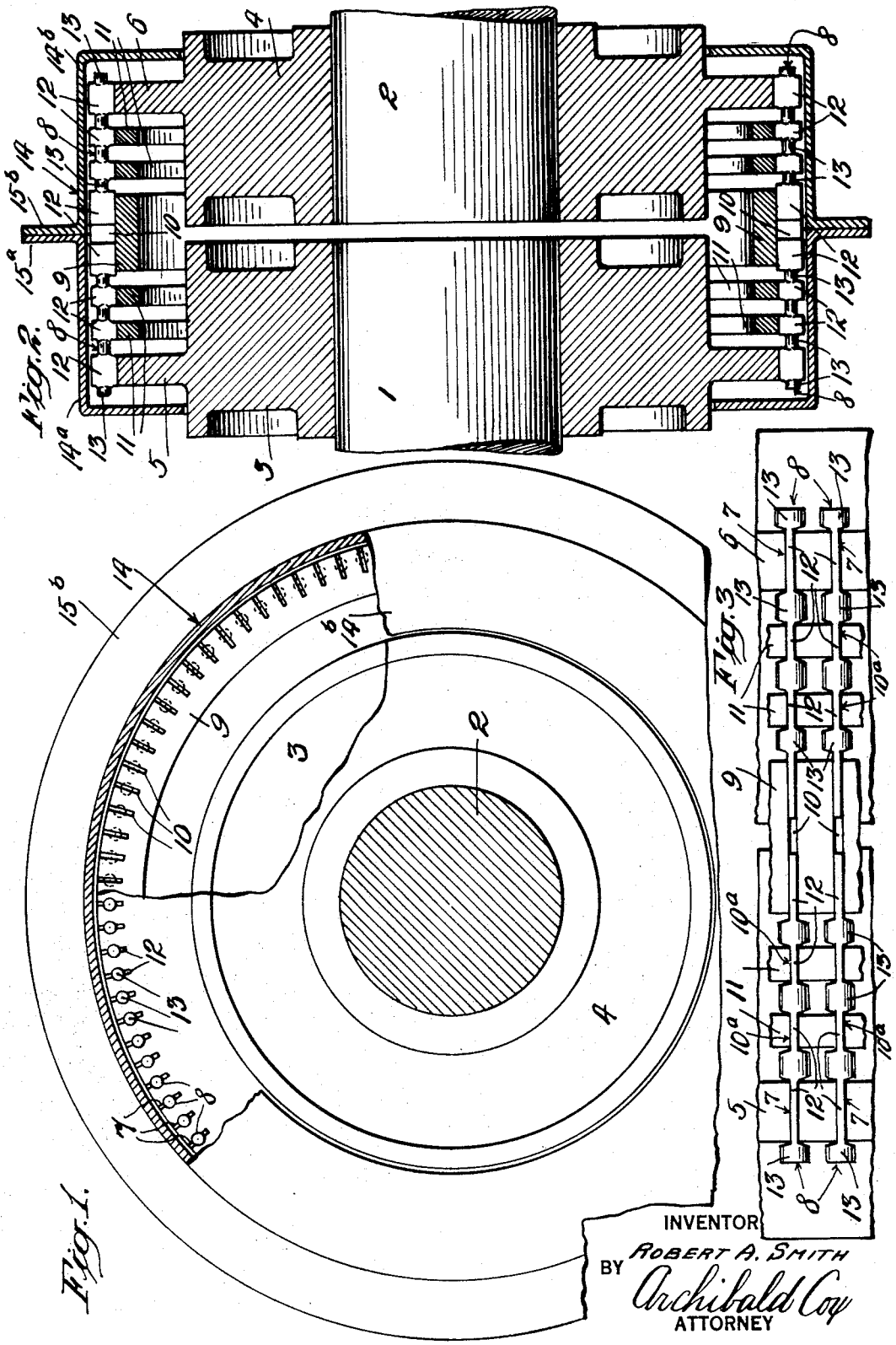
INVENTOR
Robert A. Smith
BY Archibald Coy
ATTORNEY

UNITED STATES PATENT OFFICE 1,939,370

FLEXIBLE COUPLING

Robert A. Smith, Mahwah, N. J., assignor to Smith & Serrell, Elizabeth, N. J., a copartnership consisting of Robert A. Smith and John J. Serrell Application August 6, 1930. Serial No. 473,340

11 Claims. (Cl. 64—96)

This invention relates to flexible couplings adapted for use in transmitting power from a rotary driving member to a rotary driven member, such, for example, as two substantially coaxial shafts. In installations of machinery where rotary members, such as shafts, are positioned end to end and driving connection between the same is to be established, it is almost impossible to obtain exact alignment, for example, as a result of eccentricity of the two adjacent ends or of lack of alignment as to direction when the adjacent ends are properly positioned laterally with reference to each other. If the ends of such shafts are rigidly connected, the mechanism will be subjected to heavy and unnecessary stresses and to abnormal wear if not actual breakage. Such conditions may, however, be avoided within certain limits by using suitable flexible couplings to compensate for lack of concentric and angular alignment of the two members to be connected and to provide for resilient or cushioning action between the shafts.

The present invention relates more particularly to the type of flexible couplings in which two main coupling members or flanges fixed respectively on the adjoining ends of the two shafts are connected by a plurality of members extending between the main coupling members in directions generally parallel to the axes of the shafts, the connection between the main coupling members being such as to permit parts thereof to move toward and from each other during the rotation of the shafts. To afford greater flexibility to the coupling, such coupling members or connectors may be of suitable resilient or spring material. In flexible couplings of this sort either torsional strength or flexibility must be sacrificed for the benefit of the other. The main object of the present invention is to provide an improved flexible coupling which will not only have great strength but also sufficient flexibility. Another object of the invention is to provide means for cooperating with the elements connecting the main coupling members so that such elements will be supported or stiffened at intervals between the main coupling members.

Other objects and advantages will appear upon consideration of the following detailed description and of the drawing in which:

Fig. 1 is an end view of the preferred form of coupling, parts being broken away to show the underlying structure;

Fig. 2 is a longitudinal section of the coupling shown in Fig. 1; and

Fig. 3 is a fragmentary view of the periphery of the coupling, the grease casing being removed.

The objects of the invention may, in general, be attained by connecting two rotatable parts of the coupling by a plurality of resilient members extending longitudinally of the coupling and so connected with such rotatable parts as to transmit torsional stresses between the same, and by providing floating rotary members for cooperation with the intermediate portions of the longitudinal connectors to stiffen and support the same. According to the preferred form of the invention one of the two rotatable coupling members just referred to is rigidly attached to one of the shafts and the other rotatable member is a floating ring which is connected in a similar manner with a main coupling member fixed on the other shaft. The two sets of longitudinal connectors may enter different openings in the connecting floating ring or each opening of the central floating ring may accommodate the inner ends of two connectors extending inwardly from the two main coupling members.

Referring to the drawing, 1 and 2 indicate respectively two rotary members or shafts between which a driving connection is to be established, and these shafts are provided at their adjoining ends with coupling members 3 and 4, respectively, fixedly secured thereto and which may be similar to each other. Preferably the connection between the coupling members 3 and 4 is effected through flanges 5 and 6 integral, respectively, with the coupling members 3 and 4, and in order that the flanges 5 and 6 may be spaced apart to a considerable extent without increasing the length of the coupling members 3 and 4, said flanges are positioned near the outer ends of the corresponding coupling members.

The flanges 5 and 6 are provided with suitable openings 7 to receive longitudinal connecting members 8 and preferably such openings 7 are in the form of radial slots extending inwardly from the peripheries of said flanges and arranged at regular intervals around said peripheries. As here shown the longitudinal members 8 do not extend from one of the flanges 5 and 6 to the other, but extend from said flanges to an intermediate floating ring 9 having therein suitable openings or radial slots 10 to receive the inner ends of the longitudinal connectors 8. Preferably said ring 9 is of sufficient width to receive opposite the ends of each slot 10 the inner ends of opposite connectors 8. It will be apparent that by this arrangement considerable flexibility is provided for between each of the flanges 5 and 6 and the floating ring 9.

Preferably the connectors 8 have portions of considerable length between the flanges 5 and 6 and the floating ring 9 in order to give greater flexibility, and support for the connectors 8 between said flanges and the ring 9 may be obtained by providing in such intervals additional floating rings 11 having at their peripheries suitable openings 10a to receive the longitudinal connectors 8. As here shown there are two floating rings in each interval between one of said flanges and the floating ring 9.

When the openings at the peripheries of the flanges and the floating rings are in the form of radial slots, the connectors may be merely flat springs. Preferably, however, the connectors 8 are formed not only to fit into the slots in the various rotatable members, but also so as to maintain themselves in proper position with reference to the flanges 5 and 6 and to maintain the floating rings in the proper relative positions. To this end, the connectors 8 may, as here shown, be made of round wire, such as steel wire, of a diameter which will not enter the slots, and this wire is flattened, as by stamping, to provide flat portions 12 to enter the slots while leaving round portions 13 between the slots, said round parts acting not only as spacers but providing strong connections between the flat parts of the springs which are supported by the walls of the slots. It will be seen that connectors 8 formed in this way can transmit heavy loads inasmuch as for load strength these springs have only the short lengths of round material unsupported.

With the connection between the flanges 5 and 6 provided by two sets of springs extending inwardly from the flanges and slidable in the middle floating ring, the flexibility of the coupling is considerable and at the same time the connectors or springs are supported at frequent intervals by the floating rings 11.

To protect the movable parts from dirt of various kinds and to facilitate suitable lubrication, the flanges 5 and 6 and the connections therebetween may be enclosed by a suitable grease cover 14 here shown as divided circumferentially into two parts 14a and 14b having at their adjacent inner edges flanges 15a and 15b, respectively, by which they may be fastened. Obviously many other forms of grease covers may be used to confine the lubricant.

It should be understood that various changes may be made in the construction and arrangement of parts and that certain parts may be used without others without departing from the true scope and spirit of the invention.

I claim:—

1. In a flexible coupling, the combination of two coupling members arranged for rotation about axes which are practically coincident and each of said coupling members having a flange with openings arranged around the same, an intermediate floating ring having corresponding openings, means for connecting said flanges including resilient members each positioned at one end in an opening in one of said flanges and at the other end in one of the openings in said floating ring, and means between the floating ring and the flanges and spaced therefrom, for reinforcing said resilient members.

2. In a flexible coupling, the combination of two coupling members arranged for rotation about axes substantially in alignment and each provided with radial slots at its periphery, an intermediate floating ring provided with corresponding slots, and springs mounted at one end in the slots in said coupling members and at the other end in the slots in said floating ring, said springs being thicker between the slots than where contained therein.

3. In a flexible coupling, the combination of two coupling members arranged for rotation about axes substantially in alignment and each provided with radial slots at its periphery, an intermediate floating ring provided with corresponding slots, springs mounted at one end in the slots in the coupling members and slidable at the other end in the slots in the floating ring, and means for holding the springs against sliding in the slots in said coupling members including reinforcements for said springs between said coupling members and said floating ring.

4. In a flexible coupling, the combination of two rotatable members having corresponding sets of openings arranged in circles of equal radii, resilient members extending from the openings in one of the rotatable members into the openings in the other rotatable member, and a number of floating rotatable supports arranged at intervals between said rotatable members and having openings receiving said resilient members and means for holding said floating rotatable supports in spaced relationship.

5. In a flexible coupling, the combination of two rotatable members having corresponding sets of openings arranged in circles of equal radii, resilient members extending from the openings in one of the rotatable members into the openings in the other rotatable member, floating rotatable supports arranged at intervals between said rotatable members and having openings into which the resilient members fit so as to be supported by the walls thereof, and means for maintaining the resilient members and the floating supports in position with relation to one of said rotatable members.

6. In a flexible coupling, the combination of two rotatable members having corresponding sets of radial slots at their peripheries, floating supports at intervals between said rotary members and having corresponding sets of radial slots, and resilient members having flat portions fitting in said slots and supported by the sides thereof and having thicker portions in the intervals between the rotatable members and the floating supports to impart strength in such parts and to control the positions of the floating supports between said rotatable members.

7. In a flexible coupling, the combination of two coupling members arranged for rotation about substantially coincident axes and each having a peripheral flange with openings parallel to its axis and arranged theraround, an intermediate rotatable member having corresponding openings, resilient members extending from the openings in said coupling members into the openings in said intermediate rotatable member, and supporting means for said resilient members between the coupling members and the intermediate rotatable member including a plurality of floating rings having openings receiving said resilient members.

8. In a flexible coupling, the combination of two rotatable coupling members having flanges provided with radial slots at their peripheries, an intermediate floating ring having corresponding radial slots at its periphery, floating supports positioned between the coupling members and the floating ring and having corresponding radial slots at their peripheries, and resilient members connecting said flanges with said intermediate floating ring and having flat portions fitting in corresponding slots of the coupling members, floating supports and the intermediate floating ring and thicker portions between said flat portions to impart greater strength to the coupling.

9. In a flexible coupling, the combination of two coupling members arranged for rotation about axes which are substantially coincident, an intermediate floating ring, resilient members extending from said floating ring in opposite directions and cooperating with said coupling members to provide a driving connection, and means independent of the resilient members for reinforcing said resilient members between the floating ring and the coupling members, the reinforcing means being spaced from the floating ring and coupling members.

10. In a flexible coupling, the combination of two coupling members rotatable about axes which are substantially coincident, an intermediate floating ring, resilient members extending from said floating ring in opposite directions and having driving connections with said coupling members, and floating rotatable supports between said floating ring and said coupling members and provided with openings to receive said resilient members having thin portions fitting in said openings and thicker portions at the sides of said supports to maintain the supports and resilient members in the same relative positions.

11. In a flexible coupling, the combination of two coupling members arranged for rotation about axes which are substantially in alignment and each of said coupling members having a flange with openings therein substantially parallel to the corresponding axis and arranged around the same, and means for connecting said flanges including resilient members each positioned in one of the openings in said flanges and having enlarged portions formed on them, one of said enlarged portions being arranged on each side of the flanges, so that said enlarged portions may engage the two sides of the flanges and so control the flexible member as to longitudinal movement.

ROBERT A. SMITH.